(12) United States Patent
Baldassarre et al.

(10) Patent No.: US 9,835,196 B2
(45) Date of Patent: Dec. 5, 2017

(54) ROTATING MACHINERY WITH ADAPTIVE BEARING JOURNALS AND METHODS OF OPERATING

(71) Applicant: Nuovo Pignone SRL, Florence (IT)

(72) Inventors: Leonardo Baldassarre, Florence (IT); Andrea Cianti, Florence (IT); Michele Fontana, Florence (IT); Andrea Bernocchi, Florence (IT); Daniele Panara, Florence (IT)

(73) Assignee: Nuovo Pignone Srl, Florence (IT)

( * ) Notice: Subject to any disclaimer, the term of this patent is extended or adjusted under 35 U.S.C. 154(b) by 112 days.

(21) Appl. No.: 14/786,654

(22) PCT Filed: Apr. 24, 2014

(86) PCT No.: PCT/EP2014/058341
§ 371 (c)(1),
(2) Date: Oct. 23, 2015

(87) PCT Pub. No.: WO2014/174013
PCT Pub. Date: Oct. 30, 2014

(65) Prior Publication Data
US 2016/0084301 A1    Mar. 24, 2016

(30) Foreign Application Priority Data

Apr. 24, 2013 (IT) .................... FI2013A0092

(51) Int. Cl.
*F16C 25/04* (2006.01)
*F16C 25/02* (2006.01)
*F16C 17/02* (2006.01)

(52) U.S. Cl.
CPC .............. *F16C 25/04* (2013.01); *F16C 17/02* (2013.01); *F16C 25/02* (2013.01)

(58) Field of Classification Search
CPC .......... F16C 24/04; F16C 17/02; F16C 25/02
See application file for complete search history.

(56) References Cited

U.S. PATENT DOCUMENTS 2,710,236 A    6/1955  Love
5,215,385 A *  6/1993  Ide ..................... F16C 17/026
                                                              384/100
(Continued)

FOREIGN PATENT DOCUMENTS

CN    1683800 A    10/2005
CN    102272467 A  12/2011
(Continued)

OTHER PUBLICATIONS

Machine translation of JP 2001-254731, no date.*
(Continued)

*Primary Examiner* — Thomas R. Hannon
(74) *Attorney, Agent, or Firm* — GE Global Patent Operation (57) ABSTRACT

A method for operating a rotating machinery comprising a rotor, a rotor shaft, and at least one journal bearing supporting the rotor shaft is disclosed. The bearing comprises a bearing housing, a bearing surface in the bearing housing, a sleeve torsionally and axially fitted on the shaft, and a lubrication oil film filling a clearance between the outer surface of the sleeve and the bearing surface. The method comprises the step of modifying the clearance by modifying a radial dimension of the outer surface of the sleeve as a function of a rotation speed of the shaft.

18 Claims, 4 Drawing Sheets

(56) References Cited

U.S. PATENT DOCUMENTS

| | | | |
|---|---|---|---|
| 6,494,620 B1 * | 12/2002 | Sawaguchi | F16C 17/10 384/107 |
| 2005/0201646 A1 | 9/2005 | Nagata et al. | |
| 2011/0268378 A1 | 11/2011 | Modtland et al. | |

FOREIGN PATENT DOCUMENTS

| | | | |
|---|---|---|---|
| JP | 5597517 A | 7/1980 |
| JP | 2001254731 A | 9/2001 |
| JP | 2003239972 A | 8/2003 |

OTHER PUBLICATIONS

Italian Search Report and Written Opinion dated Jan. 16, 2014 which was issued in connection with Italian Patent Application No. FI2013A000092 which was filed on Apr. 24, 2013.

International Search Report and Written Opinion dated May 20, 2014 which was issued in connection with PCT Patent Application No. PCT/EP2014/058341 which was filed on Apr. 24, 2014.

Unofficial English Translation of Chinese Office Action issued in connection with corresponding CN Application No. 201480023135.8 dated Feb. 22, 2017.

* cited by examiner

Fig.1
BACK GROUND ART

ROTATING MACHINERY WITH ADAPTIVE BEARING JOURNALS AND METHODS OF OPERATING

BACKGROUND

Field of the Invention

The subject matter disclosed herein relates to rotating machines, in particular but not exclusively to turbomachines, such as gas turbines, steam turbines, axial and centrifugal compressors. More specifically the subject matter relates to improvements concerning the bearings for the rotors of such machinery.

Description of the Related Art

Figure 1:
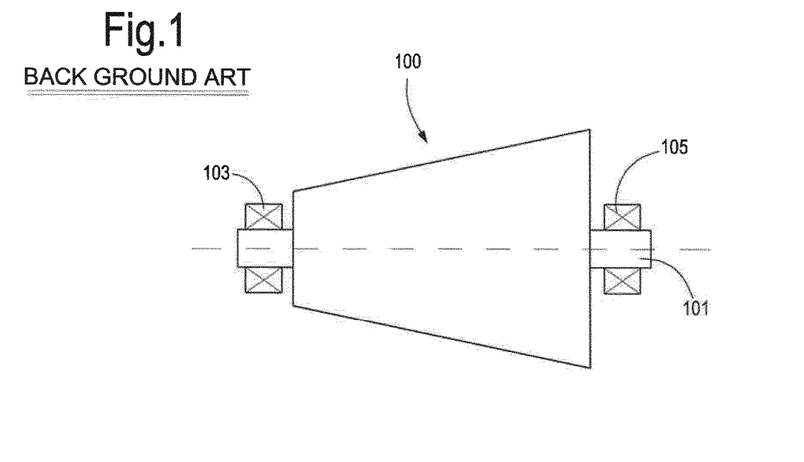
FIG. 1 illustrates schematically a rotor supported by two journal bearings.
Figure 2:
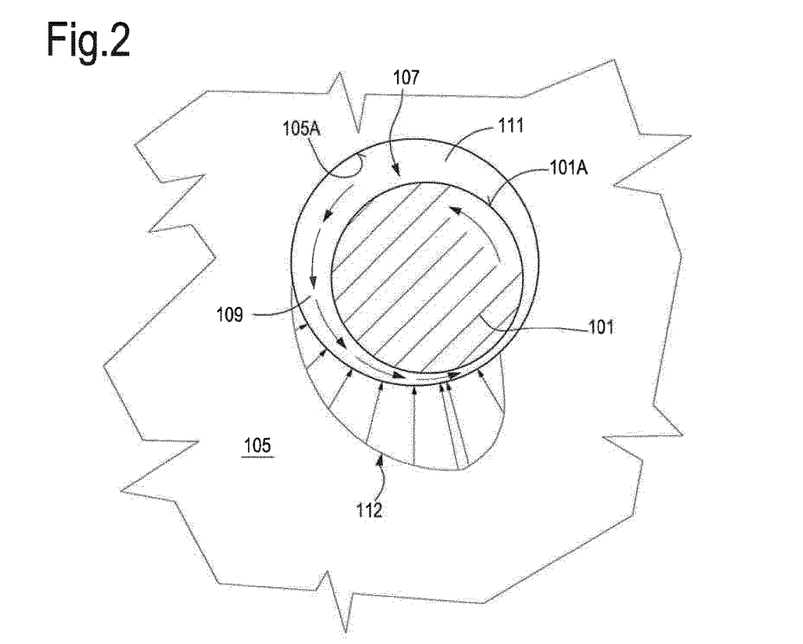
FIG. 2 schematically illustrates a cross-sectional view of a journal bearing and the relevant hydrodynamic pressure profile thereof.

Journal bearings or fluid film bearings are commonly used to support rotating shafts of machines rotors such as shafts of turbine rotors and compressor rotors. FIG. 1 schematically illustrates a turbomachinery rotor 100 comprising a shaft 101 supported in two end bearings 103, 105. The bearings 103, 105 can be journal bearings or so called hydrodynamic or fluid film bearings as schematically shown in FIG. 2. The shaft 101 is supported within a bearing 105, with an oil film 107 filling an annulus or clearance between an outer surface 101A of the shaft 101 and an inner bearing surface 105A of the journal bearing 105. The rotation of the shaft 101 generates an oil movement with a converging oil edge 109 and a diverging oil wedge or diverging oil film 111. The shaft 101 is supported by hydrodynamic pressure generated by the oil motion and having a typical profile 112 like the one shown in FIG. 2. The bearing surface 101A can be formed by a substantially cylindrical surface of the bearing 105 or by a plurality of pivoting bearing pads arranged around the rotation axis of the shaft 101.

Important hydrodynamic coefficients of a journal bearing are stiffness and damping of the bearing. Stiffness is related to the reaction of the lubrication oil film to displacements of the journal or shaft 101 opposed to the movement itself. A downward movement of the shaft 101 is opposed by an upwardly oriented restoring force generated by the oil film. Vertical stiffness is given by the restoring force divided by the displacement of the shaft. Horizontal displacement resulting in a horizontal restoring force generated by the oil film results in an horizontal stiffness of the bearing.

A further important hydrodynamic parameter of journal bearings is damping. This damping coefficient is velocity related. A downward velocity perturbation of the shaft will result in an upward restoring force generated by the oil film, in quite similar manner as a shock absorber. The faster the movement, the larger the opposing force generated by the film. A similar damping effect is provided also in the horizontal direction. Damping is beneficial in terms of suppressing vibrations under certain operating conditions. Larger damping can be obtained with a larger clearance between the bearing surface and the outer surface of the rotating shaft housed in the bearing. However, larger clearances will reduce the stiffness of the bearing, which can be detrimental under normal operating conditions of the rotor. It is sometimes advisable to have maximum damping while crossing critical speeds and maximum stiffness while operating far from critical speeds and close to full speed.

SUMMARY OF THE INVENTION

To improve the behavior of the journal bearing under different operating conditions, the journal is designed so that the outer diameter thereof can be radially deformed to selectively reduce or increase the clearance between the outer surface of the journal and the bearing surface of the journal bearing. A larger clearance is maintained at low rotation speed, to increase the damping effect and reduce amplification factors while crossing critical speeds, while at increased rotation speeds the radial dimension of the journal is increased to reduce the clearance and improve the bearing stiffness.

According to some embodiments, a method is provided for operating a rotating machinery comprising a rotor, a rotor shaft, and at least one journal bearing supporting the rotor shaft and comprised of a bearing housing, a bearing surface, a sleeve torsionally and axially fitted on the shaft and a lubrication oil film filling a clearance between the outer surface of the sleeve and the bearing surface. The method comprises the step of modifying the clearance between the outer surface of the sleeve and the bearing surface by modifying a radial dimension of the outer surface of the sleeve as a function of a rotation speed of the shaft.

In some embodiments, the step of modifying the clearance comprises the steps of: increasing a rotation speed of the shaft from a first rotation speed (e.g. zero) to a second rotation speed (e.g. the rated speed of the machine), reducing the clearance while increasing the rotation speed.

In some embodiments the step of modifying the clearance comprises the steps of: reducing a rotation speed of the shaft from a second rotation speed to a first rotation speed, e.g. to zero; increasing the clearance while reducing the rotation speed. During such run down from a higher speed to a lower speed, e.g. to zero, a step can be provided of maintaining the rotation speed of the shaft at an intermediate rotation speed between the second rotation speed and the first rotation speed to cool the shaft and increase the clearance.

In embodiments of the present invention the radial dimension of the outer surface of the sleeve is modified at least by effect of centrifugal forces generated by the rotation of the shaft. In some embodiments additional control over the radial dimension of the sleeve can be obtained e.g. using a pressurized fluid, such as but not limited to oil, delivered to an annular cavity formed between the inner surface of the sleeve facing the shaft and the outer surface of the shaft.

According to a further aspect, a rotating machine is provided, comprising a rotor, a rotor shaft and at least one journal bearing supporting the shaft, The journal bearing comprises a bearing housing with a bearing surface, wherein the shaft is being rotatingly housed. An outer sleeve is further provided, which is torsionally and axially constrained to the shaft and rotates integrally therewith. The outer sleeve have an outer surface facing the bearing surface and an inner surface facing the shaft. Sleeve thickness can either be constant or can change along its axial length. The outer surface of the sleeve can be either cylindrical or non-cylindrical. The journal bearing can have a fixed substantially cylindrical bearing surface. In other embodiments the journal bearing is comprised of a plurality of tilting pads pivotally supported in the housing and angularly distributed around the axis of the bearing. A lubrication oil-filled clearance is formed between the outer surface of the sleeve and the bearing surface. Moreover, the outer surface of the sleeve is radially deformable when the shaft is rotating, such that a radial dimension of the lubrication oil-filled clearance reduces when the shaft rotation speed increases.

In some embodiments, the radial deformation of the shaft is provoked by centrifugal forces. In other embodiments, the radial deformation of the shaft can be controlled by a pressurized fluid alone or in combination with the effect of the centrifugal forces generated by the rotation speed on the sleeve.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 3:
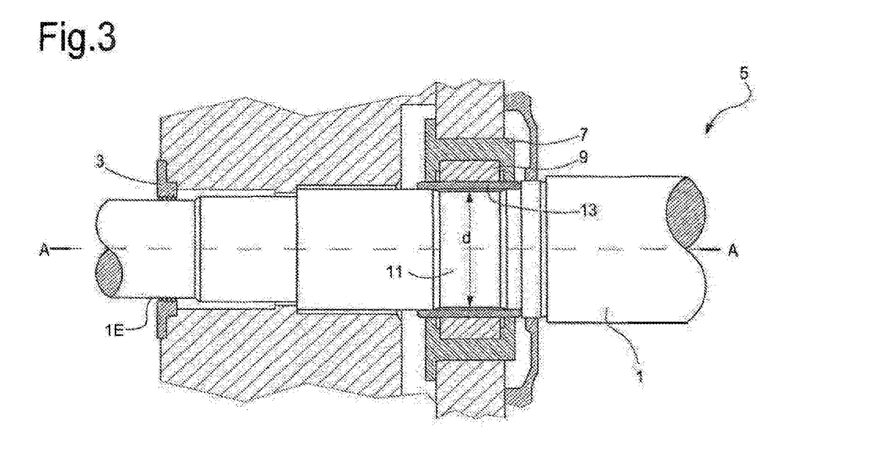
FIG. 3 illustrates a shaft end supported by a journal bearing in a first embodiment according to the present disclosure.

FIG. 3 illustrates a section along an axial plane of a shaft end and relevant journal bearing according to the present disclosure. The shaft is schematically shown at 1, 1E being the end of the shaft. Reference number 3 schematically indicates a sealing member arranged between end 1E of the shaft 1 and journal bearing 5. In some embodiments the journal bearing 5 comprises a journal bearing housing 7, wherein journal bearing pads 9 are arranged. The journal bearing pads are supported in a tiltable manner in the journal bearing housing and angularly distributed around the axis A-A of shaft 1. In other embodiments the journal bearing can be comprised of a bearing surface formed by a stiff cylindrical component surrounding the shaft 1.

In the area where the shaft 1 is supported by the journal bearing 5 the shaft 1 has a portion of smaller diameter d. This can be obtained e.g. by machining a shallow annular groove 11 in the outer surface of the shaft 1. In some embodiments the axial length, i.e. the extension in the axial direction, of the shallow annular groove 11 is approximately corresponding to or larger than the axial extension of the journal bearing pads 9. In other embodiments, the axial length of the shallow annular groove 11 can be smaller than the axial extension of the journal bearing pads 9.

Figure 4:
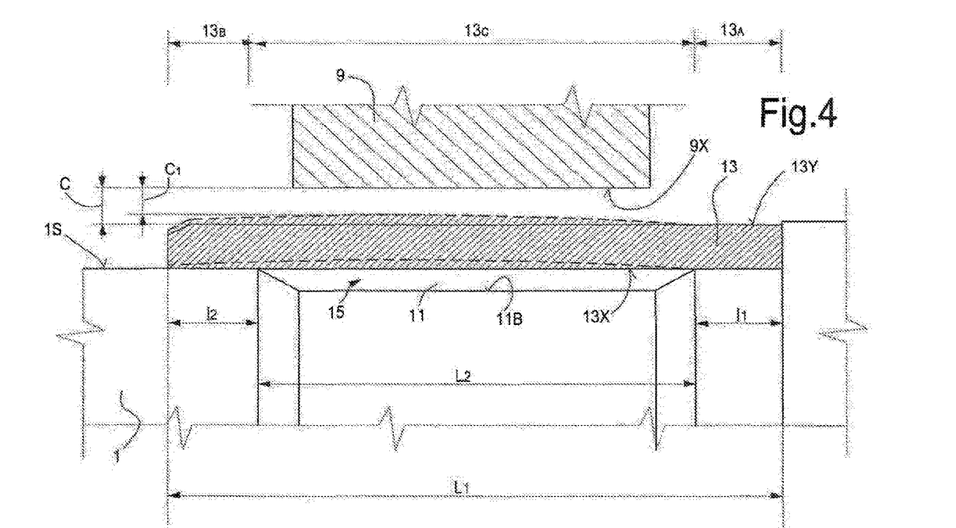
FIG. 4 illustrates a schematic enlargement of the sleeve fitted on the shaft of FIG. 3.

As better shown in FIG. 4, a sleeve 13 is fitted on the shaft around the groove 11. The axial length L1 of the sleeve 13 is larger than the axial length L2 of the groove 11, so that the sleeve contacts the outer surface 1S of the shaft 1 at both ends thereof. The sleeve can be divided into three portions, namely a first end portion 13A, a second end portion 13B, and an intermediate portion 13C. The end portions 13A and 13B correspond to the area of the sleeve 13 in which the inner surface 13X is in intimate contact with the outer surface 1S of shaft 1. The intermediate portion 13C of the sleeve 13 spans over the groove 11, so that an annular cavity 15 is formed between the bottom 11B of the annular groove 11 and the inner surface 13X of the sleeve 13 facing the shaft 1.

The outer surface 13Y of the sleeve 13 faces the bearing surface of the journal bearing 5. In the exemplary embodiment illustrated in the drawings, the bearing surface is mainly formed by the radially inwardly facing surfaces 9X of the journal bearing pads 9. In FIG. 4 the distance between the pad surface 9X and the outer surface 13Y of the sleeve 13 has been exaggerated for the purpose of clarity of representation. The figure is therefore not in scale. It shall however be understood that in actual fact the distance is much smaller than the one depicted in the drawing. The space between the outer surface 13Y of the sleeve 13 and the inner radially inwardly facing surface 9X of the journal bearing pads forms an annulus or clearance C. Since the shaft 1 is not exactly coaxial with the bearing surface 9X, the radial dimension of the clearance C is variable along the circumferential extension of the sleeve 13, in quite the same manner as the oil film represented in FIG. 2.

The diameter of the shaft 1 and of the sleeve 13 are selected so that a first degree of interference, i.e. negative allowance, is provided along the length I1 where the first end 13A of sleeve 13 is in intimate contact with the outer surface 1S of shaft 1. The interference in this area of contact is such that the outer sleeve 13 will be fitted on the shaft 1 so as to be axially as well as torsionally constrained thereto under every operating conditions, i.e. at the highest rotational speed and highest temperature which the shaft can achieve.

In some exemplary embodiments an interference is generated also between the second end 13B of the sleeve 13 and the outer surface 1S of the shaft 1 along the area marked I2 in FIG. 4. In some embodiments the degree of interference along the area I2 is less the interference along the area I1. This allows a free thermal expansion of the sleeve 13 under increased temperature conditions. The first end 13A of the sleeve is usually oriented towards the center of the shaft, while the second end 13B of the shaft is usually the one oriented towards the end 1E of the shaft 1.

In other exemplary embodiments the sleeve 13 and the shaft 1 can be dimensioned so that the sleeve 13 is fitted on the shaft 1 with no interference at the second end 13B thereof.

In the intermediate portion 13C the sleeve 13 does not contact the outer surface of the shaft 1, due to the annular cavity 15 formed between the bottom of the annular groove 11 and the inner surface 13X of the sleeve 13.

Once the sleeve 13 has been fitted on the shaft 1, the outer surface 13Y thereof is machined to obtain the required outer diameter. The diameter is dimensioned to leave a clearance C between the outer surface of the sleeve 13 and the bearing surface 9X of the journal bearing 5.

When the shaft 1 starts rotating, centrifugal forces are generated on the sleeve 13. Consequently the sleeve portions which are not subject to interference stresses will expand radially outwardly under the effect of the centrifugal forces. In FIG. 4 the sleeve 13 in a radially outwardly deformed condition under the effect of the centrifugal forces is shown in dashed lines by way of example. The radial outward expansion of the sleeve reduces the clearance, i.e. the radial dimension of the oil-filled gap or annulus between the sleeve 13 and the bearing surface from the original value C to a reduced value C1.

Figure 5:
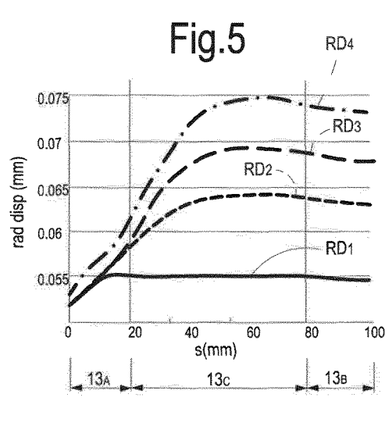
FIGS. 5 and 6 illustrate diagrams showing the radial displacement of the outer surface of the sleeve along the axial development of the sleeve under different operating conditions of the shaft.
Figure 6:
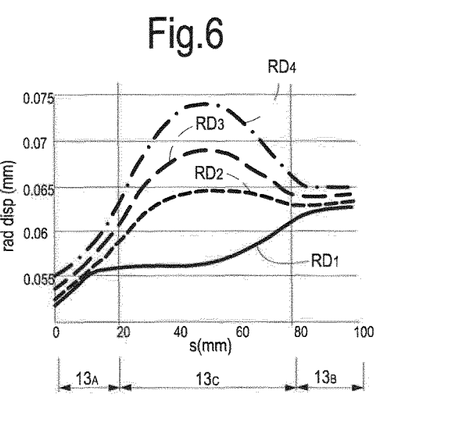

FIGS. 5 and 6 illustrate the radial displacement along the axial extension of the sleeve 13. The radial displacement has been calculated based on a finite element method (FEM) applied to the geometry of the shaft and of the sleeve as shown in FIG. 4 taking into consideration both the effect of the centrifugal forces as well as the thermal expansion due to the temperature increase of the bearing at increasing operating velocity. Along the horizontal axis the axial position along the sleeve is reported, while the vertical axis reports the radial displacement in mm. The diagram in FIG. 5 illustrates four different curves labeled RD1, RD2, RD3, RD4. Each curve corresponds to a different operating condition of the shaft-bearing system.

The curve RD1 represents the effect of the temperature only without the effect of the centrifugal forces generated by the rotation. The curves RD2, RD3 and RD4 show the radial displacement due to the combined effect of temperature and centrifugal forces under increased rotating speed: 8,000 rpm (curve RD2), 10,000 rpm (curve RD3), 11,800 rpm (curve RD4). The central area corresponding to the portion 13C of the sleeve is subject to a larger radial displacement, due to the absence of interference between the sleeve and the shaft. The curves plotted in FIG. 5 are obtained with a starting interference (i.e. interference at ambient temperature and zero speed) of $2.5°/°°$ between the first end 13A of sleeve 13 and the shaft 1, along the area I1, and $0°/°°$ between the second end 13B of sleeve 13 and the shaft 1, along the area I2.

FIG. 6 illustrates a similar diagram with different initial interference conditions between the sleeve 13 and the shaft 1. The same reference numbers designate the same curves as in FIG. 5, under the same operating conditions. The curves of FIG. 6 have being obtained by FEM assuming a starting interference of $2.5°/°°$ in the area I1 and $0.6°/°°$ in the area I2. The interference at both end portions 13A and 13B results in a reduced radial displacement of the outer surface 13Y of the sleeve at the ends thereof. The intermediate portion 13C is subject to substantially the same degree of radial displacement as in the example of FIG. 5.

The radial expansion of the sleeve 13 reduces in both instances the clearance between the outer surface 13Y of the sleeve 13 and the inner bearing surface 9X formed by the journal bearing pad 9.

By fitting the radially outwardly deformable sleeve 13 on the shaft 1 the geometry of the journal bearing can thus be modified as a function of the rotating speed of the shaft 1. As can be clearly appreciated from the above disclosure, the clearance between the outer surface 13Y of the sleeve 13 and the bearing surface 9X is larger (C) at low rotation speed and smaller (C1) at higher rotation speeds, in particular at the rated rotation speed of the shaft 1. This results in a modification of the rotodynamic coefficients of the bearing as a function of the rotation speed of the shaft 1: the bearing is stiffer at higher speed (small clearance C1), while it has a higher damping effect at lowers speeds (large clearance C).

This phenomenon has beneficial effects in particular at start-up of the machine, i.e. during run-up of the shaft 1. When the rotor supported by shaft 1 starts rotating from zero speed to the final operation speed, the rotor will cross one or more critical rotation speeds, i.e. speeds at which the rotor will be subject to resonance phenomena, with larger clearances of the bearing than the bearing clearance at full speed. The vibrations generated by resonance are damped in an efficient manner thanks to the large clearance C between the sleeve surface 13Y and the bearing surface of the 9X. Once the rotation speed of the rotor is above the critical speeds and approaches the steady state rotation speed, the journal bearing 5 becomes stiffer due to the reduced clearance C1, thus reducing vibrational effects due to non-resonance phenomena.

Figure 7:
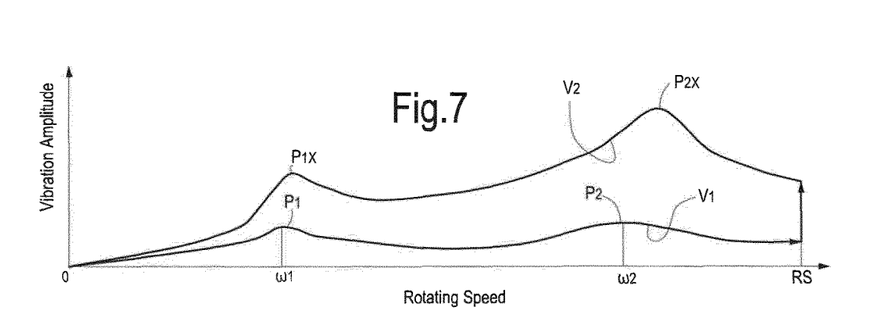
FIGS. 7 and 8 illustrate diagrams showing the vibration amplitude as a function of the rotation speed of the shaft under different operative conditions.
Figure 8:
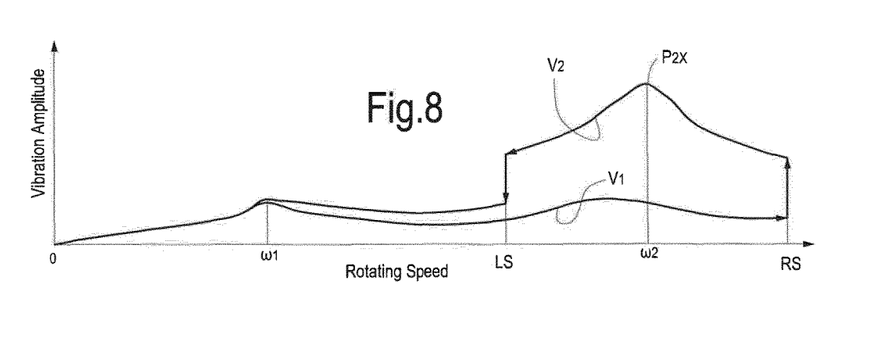

The diagrams shown in FIGS. 7 and 8 provide a visual representation of the beneficial effects obtained by the variable geometry of the journal bearing. In the diagram shown in FIG. 7 the rotation speed is reported on the horizontal axis and the vibration amplitude of the rotor is reported on the vertical axis. The curve V1 shows the vibration of the rotor during the run up phase, when the rotor accelerates from 0 to the rated speed RS. Two peaks P1 and P2 are shown along the curve V1. These peaks correspond to the critical speeds $\omega 1$, $\omega 2$. The peaks P1, P2 are relatively shallow, due to the damping effect of the large clearance C between the outer surface 13Y of the sleeve 13 and the bearing surface 9X.

The centrifugal force applied on the sleeve 13, which results in a beneficial effect in terms of rotodynamic coefficients of the bearing, is combined to the effect of the temperature which gradually increases while the shaft rotates at increasing speed until a steady temperature is achieved when the machine rotates at the final rated speed RS. The temperature increase causes a radial expansion of the sleeve 13, which is usually larger than the radial expansion of the journal bearing, this resulting in further reduction of the clearance C, C1. Consequently, during the run down, when the rotating machine is slowed down gradually from the rated speed RS to zero, absent any further countermeasure, the vibration amplitude at the critical speeds will be larger than during run-up, as schematically shown by curve V2 in FIG. 7. P2X and P1X indicate the peaks of the vibration amplitude corresponding to the critical speeds $\omega 1$, $\omega 2$ respectively during run down. The higher vibration amplitude during run down is due to temperature-induced clearance reduction.

In order to reduce the vibration amplitude when crossing the critical speeds also during run down, the rotating machine can be controlled so that it will rotate at an intermediate speed between zero and the rated speed RS for a time sufficient to cool the journal bearings and thus reducing the radial dimension of the sleeve 13. This is schematically shown in the diagram of FIG. 8, wherein curve V1 is the same as in FIG. 7. The run down curve V2 shows a peak P2X corresponding to the second critical speed $\omega 2$. When the rotating machine has reached a lower speed LS, intermediate between zero and rated speed RS, the machine is maintained under such reduced rotation speed condition until the sleeve 13 and the shaft 1 have cooled sufficiently to reduce the thermal expansion in radial direction of the sleeve 13, thus increasing the dimension of the clearance between the outer surface 13Y of the sleeve 13 and the bearing surface 9X. Run down is then continued until the rotor completely stops. The second part of the run down curve from speed LS to zero is almost coincident with the run up curve V1 showing a reduced vibration amplitude peak at the first critical speed $\omega 1$.

Figures 9, 10A:
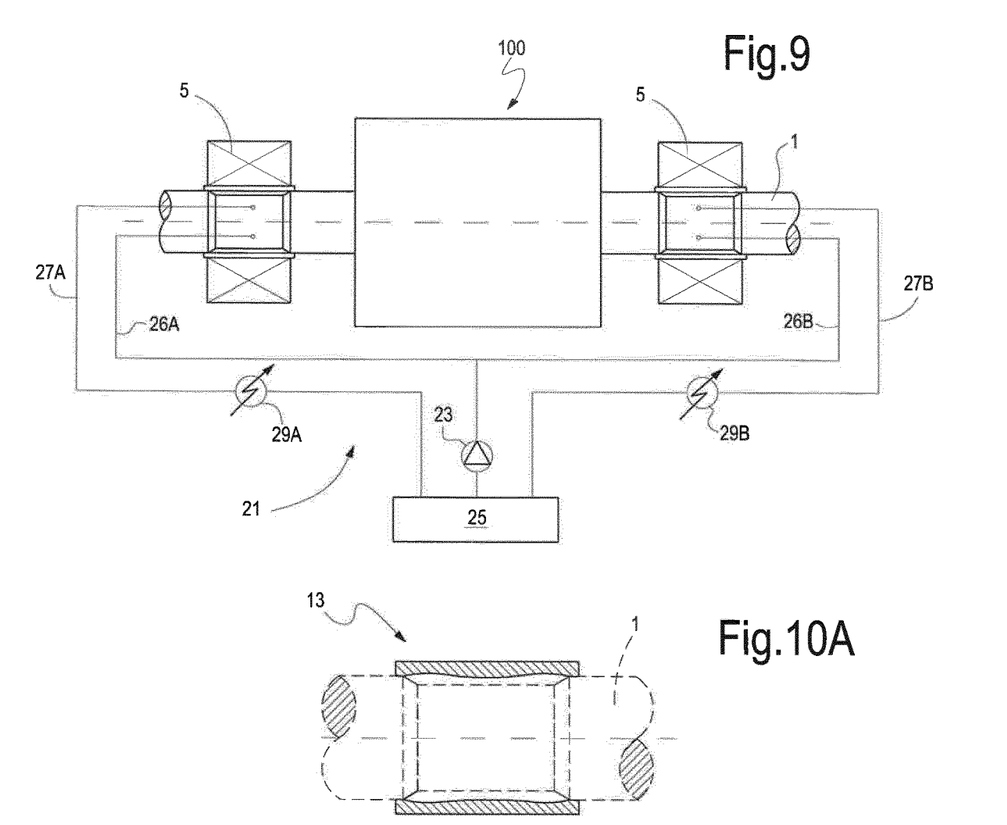
FIG. 9 illustrates a rotor with journal bearing arrangement in a further embodiment.
FIGS. 10A and 10B show two embodiments of sleeves.

According to some embodiments, the geometry of the journal bearing can be further controlled by delivering a pressurized fluid in the annular cavity 15. FIG. 9 schematically illustrates a rotor 100 comprised of a shaft 1 supported by two bearings 5. The bearings 5 can be designed as shown in FIGS. 3 and 4. A cooling fluid circuit 21 is further provided, for delivering pressurized cooling fluid into the two annular cavities 15 formed in the shaft 1. The fluid can be circulated by a pumping arrangement, schematically shown at 23, which sucks the fluid from a reservoir 25. Reference numbers 26A, 26B indicate delivery ducts, which deliver the pressurized fluid to the two journal bearings 5. Reference numbers 27A, 27B designate two return ducts for returning the fluid to the reservoir 25. The fluid can be cooled by a heat exchanger arrangement 29A, 29B. The fluid can reach the annular cavities 15 through tertiary seals or suitable holes formed in proximity of the bearings. In some embodiments the fluid can be a liquid, e.g. oil. The fluid pressure can be used to apply additional expanding force on the sleeve 13, thus increasing the radial expansion of the sleeve. In addition or alternatively the fluid can be used as a temperature-controlling medium, removing heat from the journal bearing and/or heating the journal bearing to control the thermal expansion of the sleeve 13.

In some embodiments a gaseous fluid can be used, e.g. ambient air or a gas, e.g. gas or air processed by the same rotating machine.

Figure 10B:
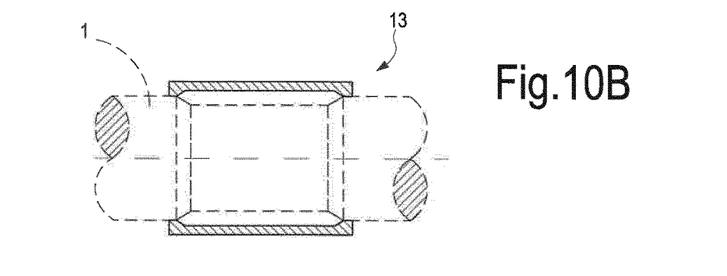

In the above described exemplary embodiments the sleeve 13 has been represented as a cylindrical hollow body having a constant thickness. This, however, is not mandatory. In some embodiments, the thickness of the sleeve can vary along the axial extension thereof. FIGS. 10A and 10B schematically illustrate two possible embodiments of sleeves 13 having a variable thickness. In general sleeve thickness distribution is one of the degree of freedom available to achieve the desired control of the bearing clearances in view of the above mentioned tasks.

In some embodiments the shaft 1 can be devoid of the annular groove 11 and the cavity 15 can be dispensed with, or formed between a cylindrical shaft having a constant radius and a sleeve 13 having a variable thickness, e.g. as shown in FIGS. 10A and 10B.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A method for operating a rotating machinery comprising a rotor, a rotor shaft, and at least one journal bearing supporting the rotor shaft and comprised of a bearing housing, a bearing surface in the bearing housing, a sleeve torsionally and axially fitted on the shaft, the sleeve having an outer surface facing the bearing surface and an inner surface facing the shaft, and a lubrication oil film filling a clearance between the outer surface of the sleeve and the bearing surface; the method comprising the step of;
   modifying the clearance by modifying a radial dimension of the outer surface of the sleeve as a function of a rotation speed of the shaft;
   wherein the radial dimension of the outer surface of the sleeve is modified by at least one of: at least by effect of centrifugal forces generated by the rotation of the shaft and pressurized fluid between the journal and the shaft.

2. The method of claim 1, wherein the step of modifying the clearance comprises the steps of: increasing a rotation speed of the shaft from a first rotation speed to a second rotation speed, reducing the clearance while increasing the rotation speed.

3. The method of claim 2, wherein the step of increasing the rotation speed between the first rotation speed and the second rotation speed comprises crossing at least one critical rotation speed of the rotor.

4. The method of claim 1, wherein the step of modifying the clearance comprises the steps of: reducing the rotation speed of the shaft from a second rotation speed to a first rotation speed; and increasing the clearance while reducing the rotation speed.

5. The method of claim 4, further comprising the step of maintaining the rotation speed of the shaft at an intermediate rotation speed between the second rotation speed and the first rotation speed to cool the shaft and increase the clearance.

6. The method of claim 1, further comprising the step of fitting the sleeve on the shaft with a degree of interference variable in an axial direction.

7. The method of claim 6, further comprising the steps of fitting at least one axial end portion of the sleeve on the shaft with a higher interference than an axial intermediate portion of the sleeve.

8. The method of claim 7, further comprising the step of forming an annular cavity between the inner surface of the sleeve and the shaft.

9. The method of claim 8, further comprising the step of pressurizing the annular cavity with a pressurized fluid and modifying the pressure of the fluid as a function of the rotation speed to increase or decrease the outer diameter of the sleeve thus reducing or increasing the clearance.

10. The method of claim 9, further comprising the step of removing heat from the bearing by means of the pressurized fluid.

11. A rotating machine comprising
a rotor;
a rotor shaft; and
at least one journal bearing supporting the shaft, the journal bearing comprising:
 a bearing housing with a bearing surface, the shaft being rotatingly housed in the bearing housing;
 an outer sleeve torsionally and axially constrained to the shaft and rotating therewith, the outer sleeve having an outer surface facing the bearing surface and an inner surface facing the shaft; and
a lubrication oil-filled clearance between the outer surface of the sleeve and the bearing surface;
wherein the outer surface of the sleeve is radially deformable when the shaft is rotating, such that a radial dimension of the lubrication oil-filled clearance reduces when the shaft rotation speed increases; and
wherein the outer surface of the sleeve is radially deformable by at least one of: under the effect of centrifugal forces generated by rotation of the journal and a pressurised fluid.

12. The rotating machine of claim 11, wherein the sleeve has a first end portion, a second end portion and an intermediate portion between the first end portion and the second end portion, and wherein at least one of the first end portion and the second end portion is fitted on the shaft with an interference greater than an interference between the intermediate portion and the shaft.

13. The rotating machine of claim 12, wherein the other of the first end portion and the second end portion is fitted on the shaft with an interference smaller than the interference between the one of the first end portion and second end portion.

14. The rotating machine of claim 12, wherein an annular cavity is provided between the inner surface of the sleeve and the shaft at the intermediate portion of the sleeve.

15. The rotating machine of claim 14, further comprising a duct for delivering a pressurized fluid in the annular cavity.

16. The rotating machine of claim 15, wherein a pressure control arrangement is provided, for controlling the pressure of the pressurized fluid as a function of the rotation speed of the rotor.

17. The rotating machine of claim 11, wherein the sleeve has a radial thickness which varies along the axial development thereof.

18. The rotating machine of claim 11, wherein the sleeve has a first end portion, a second end portion and an intermediate portion between the first end portion and the second end portion, and wherein at least one of the first end portion and the second end portion is fitted on the shaft with an interference greater than an interference between the intermediate portion and the shaft.

\* \* \* \* \*